US008380963B2

(12) United States Patent
Wang et al.

(10) Patent No.: US 8,380,963 B2
(45) Date of Patent: *Feb. 19, 2013

(54) APPARATUS AND METHOD FOR ENABLING INTER-SEQUENCER COMMUNICATION FOLLOWING LOCK COMPETITION AND ACCELERATOR REGISTRATION

(75) Inventors: Perry Wang, San Jose, CA (US); Jamison Collins, San Jose, CA (US); Hong Wang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,225

(22) Filed: Jan. 31, 2011

(65) Prior Publication Data

US 2011/0125985 A1    May 26, 2011

Related U.S. Application Data

(63) Continuation of application No. 11/901,178, filed on Sep. 14, 2007, now Pat. No. 7,904,696.

(51) Int. Cl.
*G06F 13/00* (2006.01)
(52) U.S. Cl. .............................. 712/29; 710/16; 710/305
(58) Field of Classification Search ........................ None
See application file for complete search history.

(56) References Cited

U.S. PATENT DOCUMENTS

| 5,276,887 | A  | * | 1/1994  | Haynie ........................... 710/114 |
| 5,913,227 | A  | * | 6/1999  | Raz et al. ....................... 711/152 |
| 6,088,753 | A  | * | 7/2000  | Sheafor et al. ................. 710/306 |
| 7,904,696 | B2 | * | 3/2011  | Wang et al. ...................... 712/29 |
| 2006/0150184 | A1 |   | 7/2006  | Hankins et al. ................ 718/100 |
| 2006/0224858 | A1 |   | 10/2006 | Wang et al. .................... 711/202 |
| 2007/0006231 | A1 |   | 1/2007  | Wang et al. .................... 718/100 |
| 2007/0157211 | A1 |   | 7/2007  | Wang et al. .................... 719/313 |

OTHER PUBLICATIONS

U.S. Appl. No. 11/477,643, filed Jun. 29, 2006 entitled, "Handling Address Translations and Exceptions Of A Heterogeneous Resource," by Hong Wang, et al.

* cited by examiner

*Primary Examiner* — David Huisman
(74) *Attorney, Agent, or Firm* — Trop, Pruner & Hu, P.C.

(57) ABSTRACT

In one embodiment, the present invention includes a method for communicating an assertion signal from a first instruction sequencer to a plurality of accelerators coupled to the first instruction sequencer, detecting the assertion signal in the accelerators and communicating a request for a lock, and registering an accelerator that achieves the lock by communication of a registration message for the accelerator to the first instruction sequencer. Other embodiments are described and claimed.

15 Claims, 5 Drawing Sheets

APPARATUS AND METHOD FOR ENABLING INTER-SEQUENCER COMMUNICATION FOLLOWING LOCK COMPETITION AND ACCELERATOR REGISTRATION

This application is a continuation of U.S. patent application Ser. No. 11/901,178 filed Sep. 14, 2007, now U.S. Pat. No. 7,904,696, entitled "Providing A Dedicated Communication Path Separate From A Second Path To Enable Communication Between Compliant Sequencers Using An Assertion Signal," the content of which is hereby incorporated by reference.

BACKGROUND

Computer systems include various components to process and communicate data. Typical systems include one or multiple processors, each of which may include multiple cores, along with associated memories, input/output (I/O) devices and other such components. To improve computation efficiencies, computation accelerators, special-purpose I/O devices and other such specialized units may be provided via one or more specialized components, referred to generically herein as helper units. However, inefficiencies may occur in using such helper units, as in a typical computing environment that has a general-purpose processor and an industry-standard operating system (OS) environment, system software is isolated from application software via different privilege levels. Thus whenever a helper unit such as a special-purpose accelerator is incorporated, it is usually exposed as a device and a user-level application can only indirectly use the helper unit via the OS's device driver for the helper unit.

A processor can be connected to a helper unit via a front side bus (FSB), or input/output (I/O) link such as a Peripheral Component Interconnect (PCI) Express™ interconnect, and communication is via a traditional system interrupt mechanism. Traditionally, because peripheral devices are designed by different manufacturers, the OS requires specialized device drivers provided by the manufacturers in order to communicate with the device. Programmers then write code to use common application programming interfaces (APIs) provided by the OS to control the behavior of the devices. Thus by default, any helper unit coupled to a processor is treated as a device. The problem with having to use a device driver to access a helper unit is the inefficiency (in terms of path length from application to driver to the helper unit), and inflexibility due to OS-imposed restrictions related to "standardized" driver interfaces.

DETAILED DESCRIPTION

In various embodiments, mechanisms are provided to enable instruction set architecture (ISA)-based inter-sequencer communications, which may be performed in part using a non-native communication protocol for a given interconnect. As used herein, a "sequencer" is a distinct thread execution resource and may be any physical or logical unit capable of executing a thread. A sequencer may be a logical thread unit or a physical thread unit, and may include next instruction pointer logic to determine the next instruction to be executed for the given thread. In some embodiments, the sequencer may behave as a fixed function unit that appears to be a non-sequencer to software but is implemented through microcode which is executed on a physical sequencer.

More particularly, ISA-based inter-sequencer communications may be implemented between a first sequencer of a first ISA and a second resource, which may be a sequencer or non-sequencer, of a heterogeneous nature. That is, the second resource may be a sequencer of a different ISA or may be a non-sequencer resource, such as a fixed function unit (FFU), an application specific integrated circuit (ASIC) or other pre-programmed logic. In various embodiments, an intermediary or interface, referred to herein as an "exo-skeleton," may provide for communication between such heterogeneous resources. In different embodiments an exo-skeleton may take various forms, including software, hardware, and/or firmware. In some embodiments, the exo-skeleton may be implemented in a finite state machine (FSM) tightly coupled to the heterogeneous resource. Of course, other implementations are possible.

Figure 1:
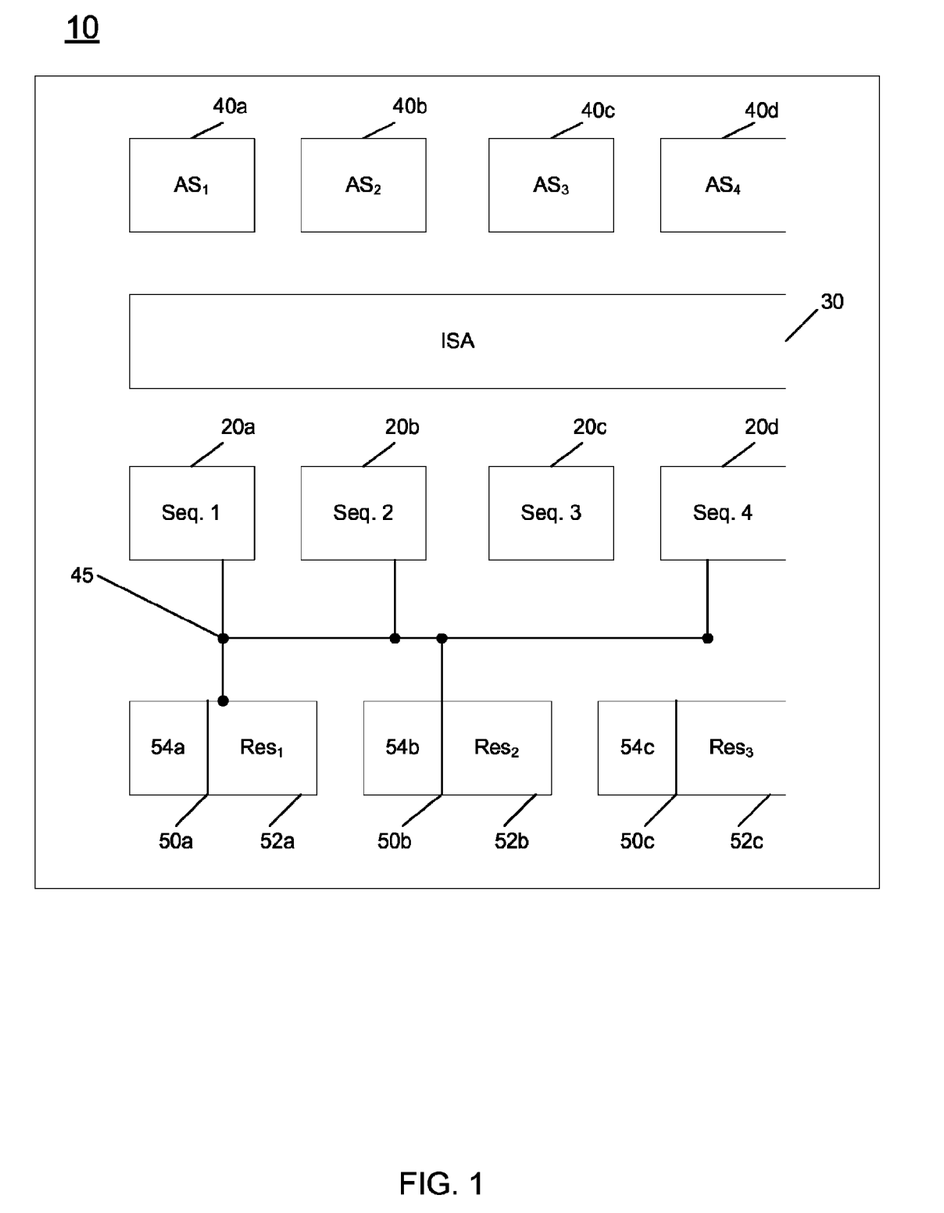
FIG. 1 is block diagram of a processor in accordance with one embodiment of the present invention.

Referring now to FIG. 1, shown is a block diagram of a processor in accordance with one embodiment of the present invention. As shown in FIG. 1, processor 10 includes a variety of different resources. In different implementations, processor 10 may be a single core processor or a multi-core processor. Such a processor may be implemented in different types of systems, including a chip multiprocessor (CMP) system, a simultaneous multithreading (SMT) system or a switch-on-event multithreading (SoeMT) system, among other such systems.

As shown in FIG. 1, processor 10 includes a plurality of sequencers 20a, 20b, 20c, and 20d (i.e., sequencers 1-4, and generically sequencers 20). While shown with four such sequencers in the embodiment of FIG. 1, it is to be understood that the scope of the present invention is not so limited. As shown in FIG. 1, sequencers 20 in processor 10 implement an ISA 30, which in one embodiment may be an Intel® Architecture (IA-32) instruction set architecture and/or its 64-bit extension (also called Intel® extended memory 64-bit technology (EM64T)). Processor 10 further includes other resources, including a first resource (i.e., resource 1) 50a, a second resource (i.e., resource 2) 50b, and a third resource 50c (i.e., resource 3) (and generically resources 50). These resources may be heterogeneous resources that do not implement the ISA 30 of processor 10. These resources may be asymmetric resources that only implement a subset of the ISA 30 of processor 10. While shown in the embodiment of FIG. 1 as including three such resources, more or fewer are possible in different embodiments.

Each resource 50 includes a sequencer (which may implement a different ISA from ISA 30), non-sequencer processing engine, or other specialized functional logic, referred to generically herein as an accelerator. In different embodiments, different types of resources may be implemented as accelerators, including a graphics processing unit (GPU) (typically a sequencer), a cryptographic unit (typically a non-sequencer), a physics processing unit (PPU) (typically a non-sequencer), a fixed function unit (FFU) (typically a non-sequencer) and the like. As shown in FIG. 1, each resource 50 may include an accelerator 52 (generically) and more specifically, accelerators 52a, 52b, and 52c, each associated with one of resources 50a-50c. Accelerators 52 are also referred to herein as helper units. Because resources 50a-50c may be of another ISA or may even be a non-sequencer and as such can be heterogeneous with respect to sequencers 20, an interface may be used to provide the ability to communicate with such resources. Specifically as shown in FIG. 1, exo-skeletons 54a, 54b, and 54c (generically exo-skeleton 54) which include communication logic may be associated with each of resources 50. Each resource 50 may thus be referred to as an "exo-sequencer," indicating the tight coupling between exo-skeleton 54 and its associated accelerator 52. In this manner, these heterogeneous resources may be integrated with homogeneous sequencer resources in a unified ISA framework that supports inter-sequencer communication (and/or shared memory-based addressing if applicable). Furthermore, the various resources may execute in a parallel fashion, for example, in a multiple instruction multiple data (MIMD) fashion so that each resource may be used concurrently to improve performance.

Referring still to FIG. 1, a specialized interconnect 45, i.e., an exo-pin, may be coupled between various ones of sequencers 20 and resources 50. Specifically, as shown in FIG. 1, interconnect 45 may couple first, second and fourth sequencers 20$_a$, 20$_b$, and 20$_d$. Furthermore, interconnect 45 may further couple resources 50$_a$ and 50$_b$.

While interconnect 45 is shown connecting only certain ones of the sequencers with certain ones of the resources, it is to be understood that in other implementations all such sequencers and resources, or a more limited set of such components may be coupled via interconnect 45. Furthermore, while shown with only this particular interconnect 45, i.e., exo-pin, understand that a native interconnect, such as a front side bus or other standard bus or interconnection of other topology (e.g., mesh, hypercube, etc.) may also be present to couple all of these components together. In some embodiments, exo-pin 45 may be an extra bus line on a front side bus or other standard interconnect, although in other implementations exo-pin 45 may be a separate dedicated interconnect. Note that in either case, communication along this interconnect may be a basic communication such as an assertion signal, either alone or in connection with a basic message to enable communication along the standard interconnect with a heterogeneous resource according to the standard communication protocol or a non-native communication protocol.

Accordingly, via connection and use of specialized interconnect 45, a non-native communication protocol for the standard interconnect may be used to perform at least certain communications between one or more sequencers 20 and one or more resources 50. For example, in some implementations, specialized interconnect 45 may be used to communicate an assertion signal from one or more sequencers 20 to enable one or more of resources 50 to communicate therewith via a non-native protocol (e.g., via a non-FSB protocol) along the standard interconnect. In this way, an exo-protocol may be used to ensure exo-compliance among these devices. While shown in the embodiment of FIG. 1 as being an interconnect within a single processor 10, which may be implemented on a single die, other embodiments may provide for a similar interconnect via a dedicated pin on multiple components, e.g., coupled via a motherboard or other connection.

Alternately, instead of a non-native protocol an extension to the native protocol for the interconnect may be adapted, in some embodiments. In such embodiments, the specialized interconnect may not be needed, and instead communications to initiate and configure operations in an exo-sequencer may instead occur on the standard interconnect. Note that this extension to the native communication protocol may be realized using a tunneling mechanism such as in connection with a virtual private network (VPN)-type enhancement such that the message to the exo-sequencer is transmitted from the sequencer tunneled within a native wrapper for the native communication protocol. For example, in some implementations, a state machine that handles the communication protocol may have additional protocol states for initiating communication with resources 50. This state machine may cause communication of special addressing or coding of transaction types that are independent of the native communication protocol. As will be described further below, in some implementations an addressing mechanism separate than a native communication protocol's addressing mechanism may be used to initiate inter-sequencer communications, without using a native communication protocol or ISA-based support.

Each of sequencers 20 may correspond to a thread context. When at least some of these thread contexts (e.g., m out of n, m≦n) are made visible to the operating system, these thread contexts are sometimes referred to as logical processors or OS-managed sequencers (OMSs). Each thread context maintains a set of the architecture state AS$_1$-AS$_n$, respectively. The architecture state includes, for example, data registers, segment registers, control registers, debug registers, and most of the model specific registers. The thread contexts may share most microarchitectural resources of the physical processor, such as caches, execution units, branch predictors, control logic and buses. Although such features may be shared, each thread context of processor 10 can independently generate a next instruction address (and perform, for instance, a fetch from an instruction cache, an execution instruction cache, or trace cache). Each of sequencers 20 corresponding to a thread context is associated with a corresponding architecture state 40 (generically). More specifically, architecture state (AS$_1$) 40a may be associated with sequencer 20a, AS$_2$ 40b may be associated with sequencer 20b, AS$_3$ 40c may be associated with sequencer 20c, and AS$_4$ 40d may be associated with sequencer 20d, for example.

Using processor 10 or a similar such processor, ISA-based inter-sequencer communications may occur without involving an OS. For example, in a shared-memory multiprocessing paradigm an application programmer may split a software program (i.e., an application or process) into multiple tasks to be run concurrently in order to express parallelism. All threads of the same software program ("process") share a common logical view of memory address space. However, an OS thread may be associated with multiple user-level threads that may not be created, scheduled, or otherwise managed by the operating system. Such user-level threads may be referred to as "shreds," in order to distinguish them from OS threads. These shreds may not be visible to the OS scheduler and therefore the OS does not manage when or how the associated OS thread schedules a shred to run on an assigned logical sequencer address.

Architectural support for ISA-based inter-sequencer communications may include extensions to an ISA such that one or more instructions are provided to allow a user to directly manipulate control and state transfers between sequencers, which may be so-called sequencer-aware or sequencer-arithmetic instructions. Such instructions may include instructions that either provide for a first sequencer to signal another (i.e., a second) sequencer (one instruction is referred to herein as a shred transfer or "SXFR" instruction, which may send egress control information, called an egress scenario, and may also carry data payload) or provide for setting up a second sequencer to monitor for such a signal (referred to herein as a shred monitor or "SEMONITOR" instruction) and perform control transfer to a handler upon receiving the signal (called an ingress scenario) asynchronously. Sequencer-aware instructions may also include other instructions such as sequencer-aware state save and restore instructions.

Thus in various embodiments, user-level management of sequencers connected via either an internal on-chip or external interconnect such as a FSB may be realized. To effect such management, an existing bus or interconnect may include an additional line to connect such sequencers (also referred to herein as exo-compliant devices). Without loss of generality, we will use bus as an example of an interconnect in general. The extra bus line may connect all devices that are exo-compliant, i.e., capable of responding to user-level ISA-based requests from an OMS. Each device has at least an extra pin, called the exo-pin (shown as reference numeral 45 in FIG. 1), to ensure protocol compliance among all the participating engine/devices, in order to achieve exo-compliance.

Thus as integrated circuits (ICs) evolve into a high degree of integration with asymmetric and heterogeneous compute engines to support application servers, high performance computing (HPC) servers and ultra-mobile devices, embodiments may allow non-ISA engines to be tied to OMSs as MIMD coprocessors. Embodiments may thus provide a platform-level architecturally visible means to tie in exo-compliant engines with a processor by conforming to an exo-transaction protocol.

Figure 2:
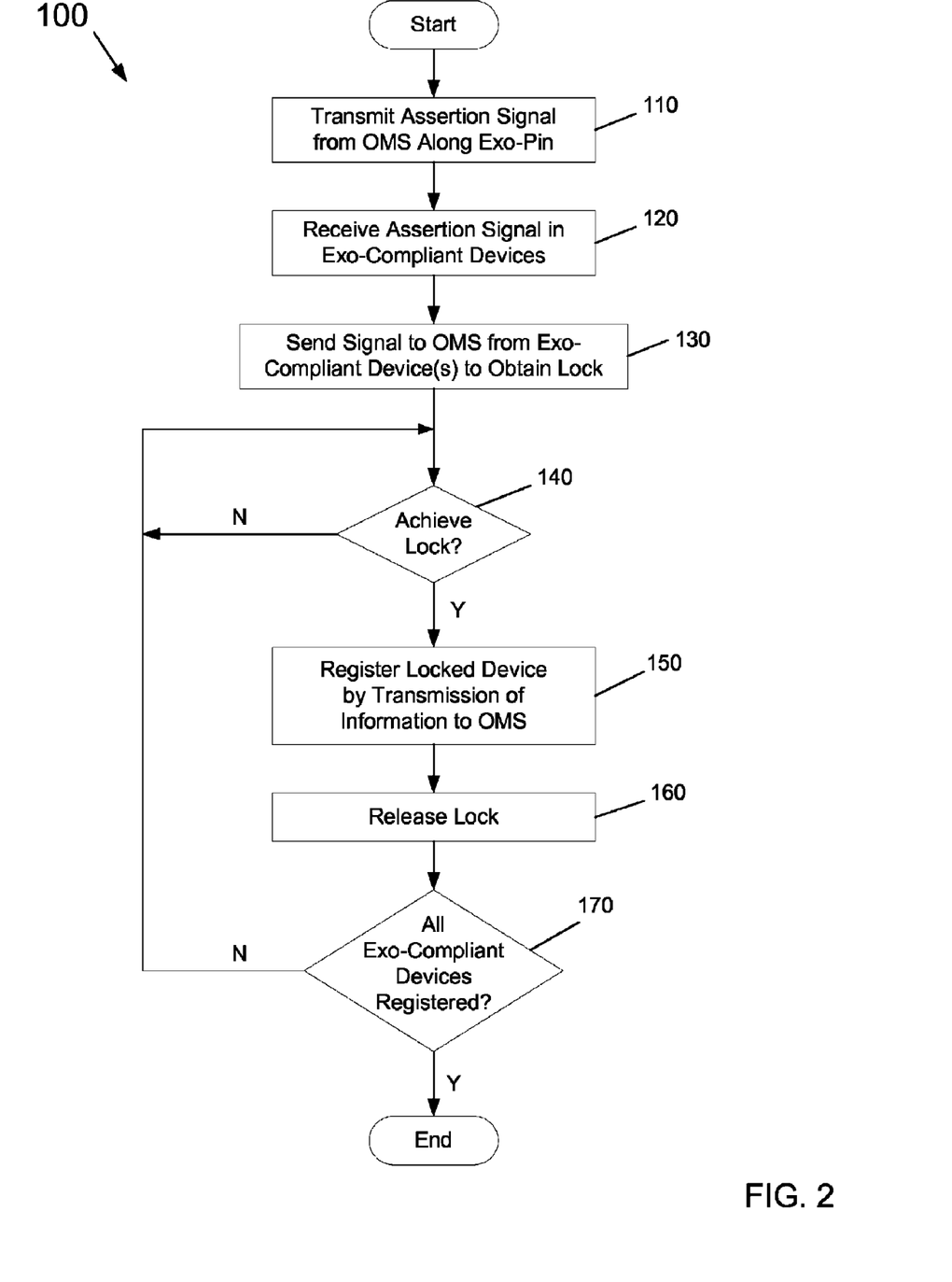
FIG. 2 flow diagram of a method in accordance with an embodiment of the present invention.

Referring now to FIG. 2, shown is a flow diagram of a method in accordance with an embodiment of the present invention. As shown in FIG. 2, method 100 may be performed to register one or more exo-compliant devices that can communicate on a specialized interconnect, i.e., an exo-pin. As shown in FIG. 2, method 100 may begin by transmitting an assertion signal from an OMS along the exo-pin (block 110). This assertion signal may be received in one or more exo-compliant devices coupled to the exo-pin (block 120). These devices may accordingly send a signal back to the OMS to seek to obtain a lock on the exo-pin (block 130). Note that this communication back to the OMS may be along the standard, i.e., non-exo-pin interconnect, e.g., the standard FSB interconnect. The OMS may select one of the devices to obtain a lock. Accordingly, it may be determined in the exo-compliant device(s) if it has achieved a lock on the exo-pin (diamond 140). If so, control passes to block 150 where the locked device may register itself by transmitting certain information along the exo-pin to the OMS (block 150). Again, this communication of information may be along the standard FSB or other interconnect. For example, the information may correspond to a device identifier (device ID) along with other information, e.g., associated with its capabilities. The OMS may establish a mapping of an exo-pin compliant device's identifier to a sequencer identifier, which can be used by sequencer-aware instructions such as SXFR. Control then passes to block 160, where the exo-compliant device may release the lock, e.g., by sending of a predetermined signal. Then it may be determined whether all compliant devices have registered (diamond 170). If not, control passes back to diamond 140, discussed above. Alternately, method 100 may conclude. While not described in the embodiment of FIG. 2, understand that after registering all such compliant devices, communication of instructions and data between an OMS and one or more of the exo-compliant devices may occur in accordance with a native communication protocol. While shown with this particular implementation in the embodiment of FIG. 2, the scope of the present invention is not limited in this regard.

The exo-pin (or pins) may be provided as an on-die interconnect or as an additional pin to provide contact with a system interconnect such as a FSB, a PCI Express™ interconnect, or other interconnect present on, e.g., a motherboard. In various embodiments this interconnect may be used for a compliance check between the processor and the participating exo-compliant devices. When the master processor (i.e., OMS) asserts its exo-pin, all slave devices that support the exo-framework detect the assertion and respond according a predetermined protocol. One example of a protocol upon the detection of an exo-assertion is for all compliant devices to compete for a lock on the bus. Once the bus is locked, the winning compliant device may register itself by sending its device identification and information back to the master processor, then relinquishes the bus for other compliant devices. The bus is freed once every device has registered itself. After such registration process has been performed, inter-sequencer communications with exo-compliant devices may be along a standard interconnect via a non-standard communication protocol using a similar assertion signal to trigger this non-standard communication protocol.

That is, the exo-pin may remain asserted throughout each exo-related inter-sequencer operation. The master processor (i.e., OMS) can start exo-operations, such as performing a SXFR to interact with an application-managed sequencer (AMS) on an exo-compliant device. Other operations can be carried out, such as an address translation remapping (ATR) mechanism, which allows the OMS to handle page faults on behalf of the device sequencers. Another operation may provide hardware support for collaborative exception handling (CEH) and a software-based exception handling mechanism, which allows faults or exceptions occurring on devices to be handled by the OMS. These operations may all be performed under the assertion of the exo-pin(s).

In general, more than 1 bit/ping can be used for exo-related operations. That is, rather than a single assertion signal (e.g., a logic high signal) along a single exo-pin, in other implementations multiple pins or a serial bit stream may be transmitted to provide both an assertion signal as well as certain information, such as a type of protocol to be used along the standard interconnect or other such information. In addition, the bus protocol running under the exo-cycles may also be different from, yet complementary to, the default processor FSB protocol. For instance, where exo-compliant devices/accelerators are connected on an advanced microcontroller bus architecture (AMBA) or other non-FSB interconnect, an exo-compliant bridge can be used between FSB and the AMBA interconnect. Then, when the exo-pin is asserted, the master processor can communicate with its exo-compliant devices via the AMBA bus protocol through the FSB-to-AMBA bridge. This allows the system to have plug-and-play legacy devices that may not be exo-compliant, yet appear to be compliant to the processor due to compliance of the FSB-to-AMBA bridge. Once the master processor de-asserts the exo-pin, the processor and the released device would return back to the default protocol operation.

When non-exo-compliant master processors are running in parallel with the exo-compliant master processor, they may be contending for the same devices that are already participating in exo-operations. In such case, the exo-compliant device may reject all requests from the non-exo-compliant processors in order to continue participation in the exo-operations. Conversely, a device may be configured to be both exo-compliant (thus appearing to be an ISA-based coprocessor/accelerator to the processor) or non-exo-compliant, simply by conforming to exo-pin based transactions/protocols. Thus especially in a system on a chip (SoC) heterogeneous integrated environment, an accelerator core can be integrated or configured either as a regular device using a conventional device driver software stack or as an exo-compliant accelerator that can be managed directly by a user-level application. For example, a GPU core can be used to run a legacy display device driver software stack like DirectX™, or to run general purpose computation acceleration as a processor's MIMD function unit.

Figure 3:
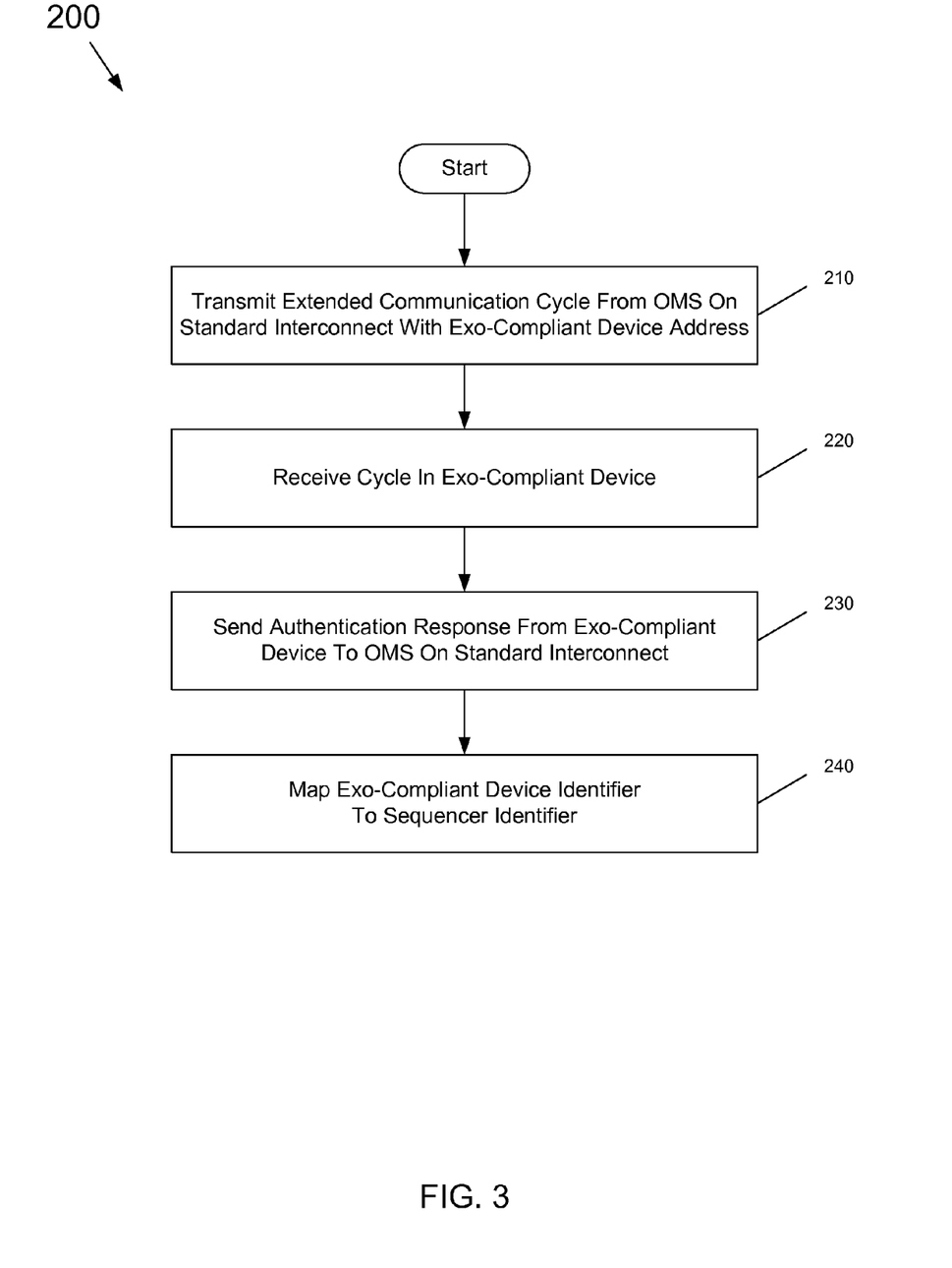
FIG. 3 is a flow diagram of a method in accordance with another embodiment of the present invention.

Referring now to FIG. 3, shown is a flow diagram of a method in accordance with another embodiment of the present invention. As shown in FIG. 3, method 200 may be used to communicate between a OMS and an exo-compliant device, i.e., a heterogeneous resource, using an extension to a native communication protocol. Note that this embodiment may be referred to as a virtual pin mechanism as the need for a separate interconnect such as the exo-pin described above can be avoided. As shown in FIG. 3, method 200 may begin by transmitting an extended communication cycle from the OMS on the standard interconnect with an exo-compliant device address (block 210). For example, the OMS may cause transmission of a message using a protocol different than a native communication protocol. For example, a PCI Express™ protocol may be extended using a state machine associated with the interconnect to provide for this communication cycle. This communication cycle may include an address of the exo-compliant device to which the communication is directed. Note that in the embodiment of FIG. 3, communications may be directed to a given exo-sequencer. However, in other implementations a broadcast mechanism such as described above regarding FIG. 2 may be used.

Referring still to FIG. 3, next the communication cycle may be received in the exo-compliant device (block 220). For example, an exo-skeleton of the exo-sequencer or other such device may receive and decode the communication cycle. Responsive to this communication cycle, the exo-sequencer may initiate an authentication mechanism in which it sends an authentication response to the OMS, also along the standard interconnect (block 230). Finally, the OMS may map the exo-compliant device identifier to a sequencer identifier, e.g., in a mapping table of the OMS (block 240). In this way, the exo-compliant device may be initiated and configured. Accordingly, after this configuration further communications between the OMS and the exo-sequencer may occur along the standard interconnect using the native communication protocol of the interconnect such as a PCI Express™ protocol. Accordingly, ISA-based instructions that provide sequencer-aware operations such as SXFR may then be transmitted to the exo-sequencer, without OS support or a device driver as described above. While described with this particular implementation in the embodiment of FIG. 3, the scope of the present invention is not limited in this regard.

Figure 4:
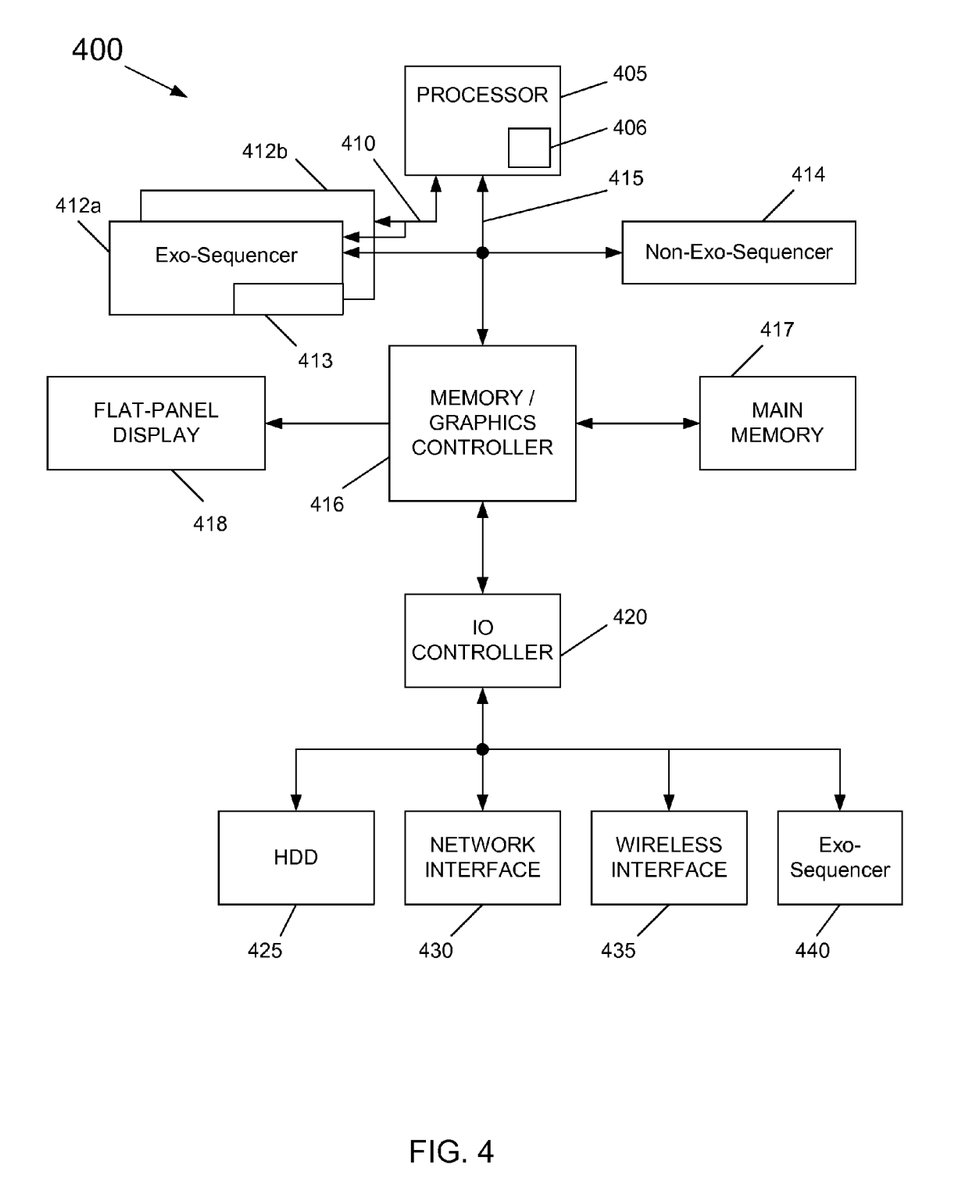
FIG. 4 is a block diagram of a system in accordance with one embodiment of the present invention.

Referring now to FIG. 4, shown is a block diagram of a system in accordance with one embodiment of the present invention. As shown in FIG. 4, system 400 includes a processor (e.g., sequencer) 405 coupled to a graphics memory controller hub (GMCH) 416 via a FSB 415. Processor 405 further includes logic 406 to enable exo-communications along a separate exo-pin 410. As further shown, a plurality of exo-sequencers $412_a$ and $412_b$ (generically exo-sequencer 412) are coupled to FSB 415, as is a non-exo-sequencer 414. Note that exo-sequencer 412 is also coupled via exo-pin 410 directly to processor 405. In this way, during execution of a software stack, exo-sequencer 412 may be managed via ISA commands by an application as a MIMD functional unit to processor 405. Exo-pin 410 thus provides exo-compliant transactions/protocols. Note that exo-sequencer 412 may include logic 413 to enable communications in accordance with the exo-compliant transaction/protocol. If exo-sequencer 412 is configured not to operate in this exo-compliant mode, communication instead may be managed by a device driver. Because non-exo-sequencer 414 lacks coupling via an exo-pin, communications between processor 405 and itself may be via a device driver.

GMCH 416 in turn is coupled to a memory 417 that may be, for example, a dynamic random access memory (DRAM). Furthermore, GMCH 416 is coupled to a display 418 (such as a flat panel display). GMCH 416 may include an integrated graphics accelerator. GMCH 416 is further coupled to an input/output (I/O) controller 420, which may be used to couple various peripheral devices to system 400. Shown for example in the embodiment of FIG. 3 is a hard disk drive (HDD) 425, a network interface 430, a wireless interface 435, and an exo-sequencer 440, each of which is coupled to I/O controller 420, e.g., via a PCI Express™ interconnect. While shown with this particular implementation in the embodiment of FIG. 4, the scope of the present invention is not limited in this regard. Note that in the embodiment of FIG. 4, communications between processor 405 and exo-sequencers 412 may occur using the benefit of exo-pin 410. In contrast, communications between processor 405 and exo-sequencer 440 may occur using the standard interconnect mechanisms of system 400. Accordingly, communications between processor 405 and exo-sequencer 412 may occur in accordance with that described above regarding FIG. 2, while instead communications between processor 405 and exo-sequencer 440 may occur as described above regarding FIG. 3.

Figure 5:
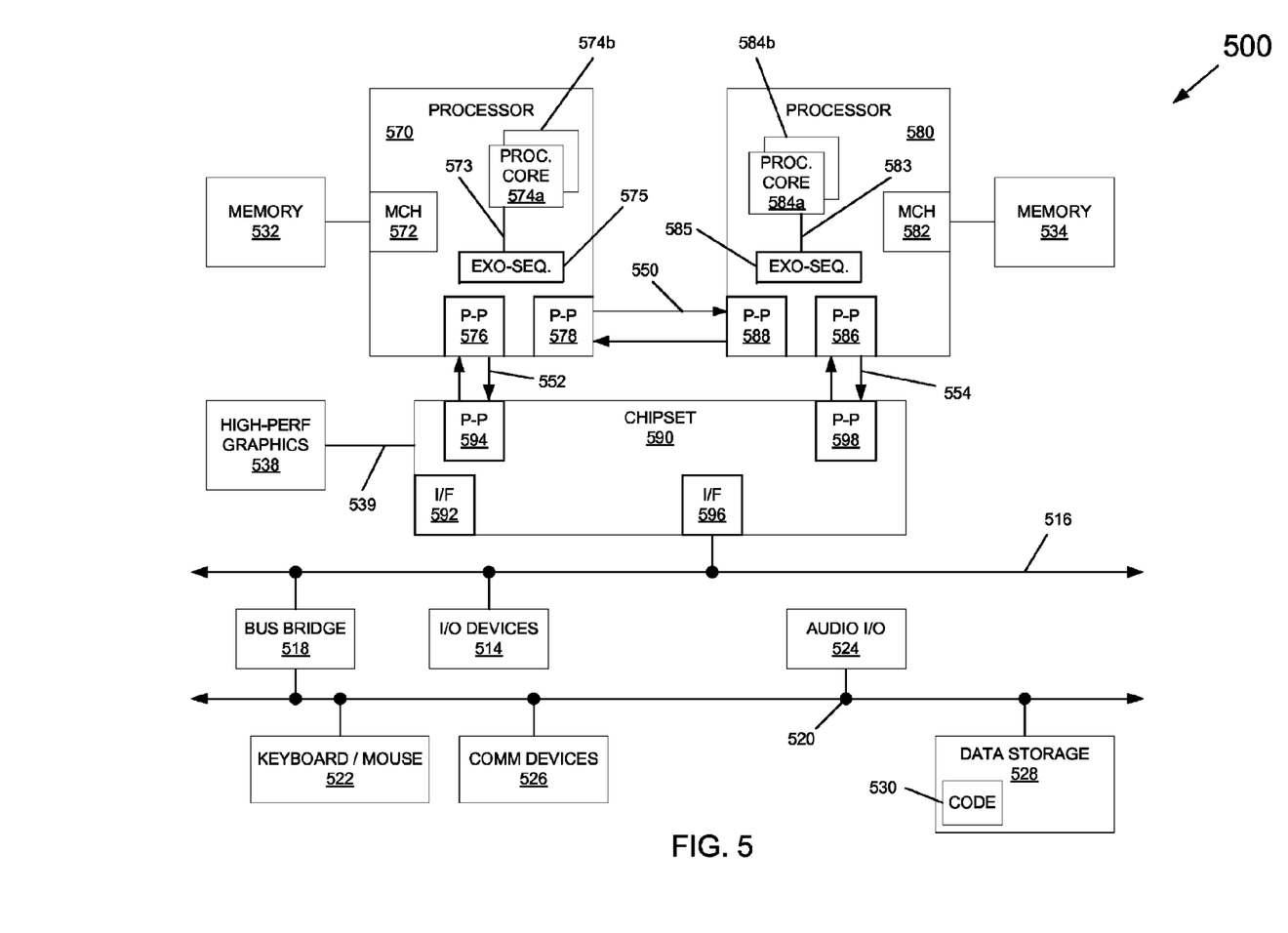
FIG. 5 is a block diagram of a system in accordance with another embodiment of the present invention.

Embodiments may be implemented in many different system types. Referring now to FIG. 5, shown is a block diagram of a system in accordance with another embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Each of processors 570 and 580 may further include an exo-sequencer, i.e., a first exo-sequencer 575 and a second exo-sequencer 585. As discussed above, exo-sequencers 575 and 585 may be heterogeneous resources with respect to the remaining resources of processor cores 570 and 580. While shown with only a single exo-sequencer per processor, it is to be understood that the scope of the present invention is not so limited. In other embodiments, multiple exo-sequencers may be present in a given processor. Furthermore, one or more exo-sequencers may be associated with each individual core of a processor. As further shown in FIG. 5, each processor may include an exo-pin 573 and 583, respectively, to provide an exo-compliant communication path between the given exo-sequencer and one or more of the processor cores to enable exo-compliant communication protocols between an OMS (e.g., one of processor cores $574_a$ and $574_b$ and $584_a$ and $584_b$) and a corresponding exo-sequencer 575 and 585.

First processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 or a point-to-point interconnect may be used to couple graphics engine 538 to chip set 590.

In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first processor core to execute instructions; and
an accelerator coupled to the first processor core, the accelerator to perform at least one operation on data received from the first processor core, the accelerator comprising a heterogeneous resource with respect to the first processor core and communication logic to enable inter-sequencer communication between the first processor core and the accelerator according to a non-native communication protocol, wherein responsive to an assertion signal provided from the first processor core, the accelerator is to transmit a signal to compete for a lock with another accelerator, and responsive thereto the first processor core is to select whether the accelerator or the another accelerator is to obtain the lock, receive a registration message from the selected accelerator, and register the selected accelerator responsive to the registration message.

2. The apparatus of claim 1, wherein the accelerator is to communicate identification information to the first processor core, and thereafter the first processor core is to provide the assertion signal to the accelerator to enable the inter-sequencer communication.

3. The apparatus of claim 1, further comprising a second processor core to communicate with the accelerator, wherein the accelerator is to reject a request from the second processor core during an operation for the first processor core.

4. The apparatus of claim 1, wherein the apparatus comprises a processor having a single substrate including the first processor core and the accelerator.

5. The apparatus of claim 4, further comprising a first bus and a second interconnect separate from the first bus to couple the first processor core and the accelerator.

6. The apparatus of claim 5, wherein the first processor core is to execute a compliance check via the assertion signal on the second interconnect and the accelerator is to seek the lock on the first bus responsive thereto.

7. The apparatus of claim 6, wherein the first processor core is to maintain the assertion signal on the second interconnect during the inter-sequencer communication along the first bus.

8. The apparatus of claim 6, further comprising a plurality of accelerators coupled to the first processor core via the first bus, wherein only a subset of the accelerators are coupled to the first processor core via the second interconnect.

9. The apparatus of claim 8, wherein the first processor core is to communicate with the subset of the accelerators without operating system (OS) support and without a device driver, and communicate with the other accelerators with OS support and with a device driver.

10. The apparatus of claim 1, wherein the first processor core comprises a processing engine of a native instruction set architecture (ISA), and the accelerator comprises a processing engine of a non-native ISA.

11. A method comprising:
communicating an assertion signal from a first instruction sequencer to a plurality of accelerators coupled to the first instruction sequencer, wherein at least one of the accelerators comprises a heterogeneous resource with respect to the first instruction sequencer;
selecting, in the first instruction sequencer, an accelerator to obtain a lock responsive to a request to compete for the lock communicated from at least some of the plurality of accelerators after detection of the assertion signal in the at least some accelerators; and
receiving a registration message from the selected accelerator in the first instruction sequencer, and registering the selected accelerator in the first instruction sequencer responsive to the registration message.

12. The method of claim 11, further comprising sending a request to the heterogeneous resource via a first instruction set architecture for an inter-sequencer operation, wherein the heterogeneous resource comprises a resource of a second instruction set architecture.

13. The method of claim 12, further comprising communicating the request without operating system (OS) support and without a device driver, wherein the heterogeneous resource is transparent to the OS.

14. The method of claim 13, further comprising communicating a second request from the first instruction sequencer to a second one of the plurality of accelerators comprising a second heterogeneous resource with OS support and with a device driver.

15. The method of claim 12, wherein a first interconnect and a second interconnect comprising a front side bus (FSB) are coupled between the first instruction sequencer and at least one of the plurality of accelerators, and wherein communication along the FSB is to be according to a non-FSB communication protocol when the second interconnect is asserted via the assertion signal.

* * * * *